United States Patent [19]

Allan et al.

[11] 4,200,928
[45] Apr. 29, 1980

[54] METHOD AND APPARATUS FOR WEIGHTING THE PRIORITY OF ACCESS TO VARIABLE LENGTH DATA BLOCKS IN A MULTIPLE-DISK DRIVE DATA STORAGE SYSTEM HAVING AN AUXILIARY PROCESSING DEVICE

[75] Inventors: Iain D. Allan, Saratoga; Per-Erik Walberg, San Jose, both of Calif.

[73] Assignee: Sperry Rand Corporation, New York, N.Y.

[21] Appl. No.: 871,283

[22] Filed: Jan. 23, 1978

[51] Int. Cl.² ............................................. G06F 13/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,544,966 | 12/1970 | Harmon | 364/200 |
| 3,629,860 | 12/1971 | Capozzi | 364/200 |
| 3,678,464 | 7/1972 | Peters | 364/200 |
| 3,809,884 | 5/1974 | Nibby et al. | 364/200 |
| 3,919,695 | 11/1975 | Gooding | 364/200 |
| 4,050,096 | 9/1977 | Bennett et al. | 364/200 |
| 4,050,097 | 9/1977 | Miu et al. | 364/200 |
| 4,060,794 | 11/1977 | Feldman et al. | 364/900 |
| 4,096,569 | 6/1978 | Barlow | 364/200 |

Primary Examiner—Melvin B. Chapnick
Attorney, Agent, or Firm—Kenneth R. Allen; Eugene T. Battjer; William E. Cleaver

[57] ABSTRACT

A method and apparatus for accessing data blocks in a computer system having multiple-disk drive rotational position sensing which is not centrally synchronized and where data read and write requests are normally weighted by the order of availability of requested data blocks. The weighting of the priority, or queue position, of selected data blocks is modified by advancing the apparent initial location of data blocks designated for preferental access and maintaining an availability signal, or peripheral interrupt, for an extended period. A special pre-data-transfer instruction indicates the duration of the peripheral interrupt. A circuit for implementing the invention has a storage register for receiving the special instruction, a down counter for decrementing for the duration of the designated pre-data-interrupt and an interrupt duration control latch for issuing and extinguishing the interrupt. The invention permits preferential processing of demand type high priority data where there is no central clock synchronization among peripheral storage devices.

5 Claims, 10 Drawing Figures

| TRANSFER BEGINS IN CLOCK UNIT: | |
|---|---|
| $X_2^*$ | 2 |
| $X_1^*$ | 9 |
| $X_5$ | 16 |
| $X_{10}^*$ | 24 |
| $X_{12}$ | 33 |
| $X_0$ | 39 |
| $X_4$ | 45 |
| $X_9$ | 51 |
| $X_{14}$ | 57 |
| $X_{13}^*$ | 69 |
| $X_6^*$ | 77 |
| $X_{15}$ | 83 |
| $X_8$ | 91 |
| $X_3$ | 100 |
| $X_{11}$ | 108 |
| $X_7$ | 119 |

* DENOTES LONG SECTOR ASSIGNMENT

METHOD AND APPARATUS FOR WEIGHTING THE PRIORITY OF ACCESS TO VARIABLE LENGTH DATA BLOCKS IN A MULTIPLE-DISK DRIVE DATA STORAGE SYSTEM HAVING AN AUXILIARY PROCESSING DEVICE

BACKGROUND OF THE INVENTION

1. Field of the Invention

This invention relates to a technique for improving the input/output (I/O) rate of serial digital data transfer, for example, for accessing data stored in periodic tracks of a plurality of asynchronous mass storage devices such as rotating disk drives in a computer system.

In large scale computer systems, there are generally two types of data processing tasks to be serviced, namely demand-oriented real time tasks and batch tasks. In many large scale systmes, the principal limitation on efficient computer usage is data input to and output from the central processing unit (CPU). For example, the ratio of average I/O access time to CPU memory access time can be as large as 500,000 to 1 for the most rapid mechanically accessed mass storage devices such as disk drives.

There is a basic conflict between fast response for real time systems, such as time-shared terminals, and maximum throughput. For maximum throughput, the first available data block must always be accessed, which may delay demand-oriented tasks. Moreover, there may be a conflict between the priority of a task and the length of time required to perform the task.

In a partial effort to solve the conflict problem, a master control program associated with the CPU called a Supervisor or an Executive program manages the tasks according to priorities, queuing instructions, issuing commands and responding to and interrupting requests for service in order to assure that all tasks are carried to completion.

However, CPU-generated priorities generally do not take into account the possibility of near instantaneous availability of data on peripheral I/O devices in a multiplexed (multiple channel) I/O system, since the devices do not maintain synchronism with the CPU. The result is waste of valuable CPU time while the CPU waits for the availability of a data storage position in a peripheral storage device.

2. Description of the Prior Art

In an effort to improve throughput and to avoid wasting CPU time, a portion of decision-making related to availability of an I/O device, and particularly related to identification of a data storage position on particular peripheral storage devices such as a disk drive, has been delegated to a peripheral I/O controller. One such system is described in U.S. Pat. No. 3,544,966. In such a multiplexing controller, a peripheral control unit periodically monitors the status of each associated I/O device and serves as an intelligent switch to connect and disconnect the I/O devices to a data communication channel coupled to the CPU. The controller polls the peripheral devices about availability and renders the decisions to connect and disconnect a peripheral device to the data channel.

A well known technique for effecting delegated availability decisions for disk drive controllers is Rotational Position Sensing (RPS). The operation of an RPS system is described in the IBM 3830/3330 Reference Manual, published by IBM Corporation, San Jose, California. Examples of commercially available RPS systems are the IBM Model 3330 disk drive with the RPS-based IBM Model 3830 controller and the ISS/Sperry Univac Model 7330 disk drive and 7830 controller.

In the RPS technique, the position of a periodically accessible interval, called a sector, on a rotating track of a disk is sensed relative to a track or disk index position, which is a fixed location on the moving disk. The relative positions of data records can be calculated by reference to sector position on rotating disks. The disk drive presenting the first-available sector containing requested data is electrically coupled by the controller through a channel to the CPU to effect data transfer. Upon completion, the controller releases control of the CPU channel and the disk. Thereafter, the rotational position of each disk drive is again polled, and the disk drive having the next first available data segment is then connected to the CPU data channel until the completion of data transfer. The RPS technique produces excellent throughput. Unfortunately, realtime requests receive no preference, so demand performance is relatively poor.

In a conventional multiplex-type data access system, one or more blocks of data may be available to the controller for access during a selected interval or window of time. The condition of overlap of windows is known as contention. In the prior art RPS technique the problem of contention has not been specifically addressed and has normally been handled by the peripheral controller unilaterally acting to select a particular disk drive. For example, the peripheral controller has generally selected the lowest numbered drive or the next higher drive after the last drive serviced. Thus, no preference has been given for priority of data types among stored data.

Moreover under the RPS system, control connection is maintained or otherwise reserved to the particular disk drive until the data channel becomes free and data transfer has been completed. As a consequence, slightly later beginning data blocks must await a complete recycling of the rotation period and possible interruptions by other disk drives before control can again be established to the drive on which is stored the later beginning data block. This delay can cause considerable interruption to demand-oriented processing such as time-shared terminal operations. Such delays are both costly and undesirable.

Therefore, a new technique is needed which provides for effective priority servicing of real time requests in lieu of a batch request where there is insufficient time to complete a batch request prior to servicing a real time request. Moreover, a computer peripheral control system is needed which minimizes the amount of CPU time wasted in waiting for the availability of a data I/O device.

SUMMARY OF THE INVENTION

According to the invention, CPU-generated priorities are weighted in a rotational position sensing (RPS) input/output (I/O) system by advancing the apparent initial location of the data block thereby improving queue position and by increasing the duration of an interrupt signal indicating availability of a data block on a track of a mass storage device such as a disk drive. A special pre-data-transfer instruction indicates to a disk drive the duration of the interrupt signal for each prioritized data block. A circuit is disclosed which receives a digital command, issues an interrupt and extinguishes the interrupt at the end of the extended interrupt duration. The circuit permits the selection of interrupt durations of variable length. The circuit comprises a storage register for receiving a four-bit instruction set corresponding to the desired duration of the interrupt, a down counter for decrementing for the duration of the interrupt, and an interrupt duration control latch for holding and extinguishing the interrupt. The circuit is deactivated and bypassed except upon issuance of a separate single bit enable command from the I/O controller so that conventional RPS interrupt operations can be performed. The circuit implements what is called "long sector" processing of data. Deactivation of the circuit produces "normal sector" processing according to the known RPS technique.

One object of this invention is to provide an option for improving demand performance particularly in an RPS disk drive system. One of the advantages of such an option in an RPS system is the availability of priority control to the computer operator, to the real-time user or to the Supervisor program while minimizing the degradation of data throughput.

A further object of the invention is to provide a simple circuit which when enabled provides long sector processing which when disabled provides normal sector processing according to the RPS technique.

A still further object of the invention is to provide a circuit for implementing an extended duration interrupt so that the period during which a peripheral device appears to be available to an I/O controller is extended thereby increasing the likelihood that the peripheral device will be selected.

It is a further object of the invention to provide means for variably increasing the apparent length of a record window and advancing the queue position of designated priority data. This has the advantage of providing an opportunity for a channel connection without need for recycling the entire track and to override a normal RPS interrupt. In this manner the advance in priority of the selected record negates the effect of contention between blocks of data.

Other objects and advantages will be apparent from the following detailed description.

BRIEF DESCRIPTION OF THE DRAWINGS

The invention will be better understood by reference to the following detailed description taken in conjunction with the accompanying drawings in which.

DETAILED DESCRIPTION OF THE PREFERRED EMBODIMENTS

According to the invention, Long Sector Processing (LSP) advances the apparent real-time queue position of a data block. An LSP circuit 10 operates in a Control Unit Device Interface (CUDI) environment with a microprocessor based system control unit (SCU) 12. The SCU 12 supervises a disk drive such as the Model 7350 Disk Storage Drive developed by ISS Sperry-Univac of Cupertino, California and cooperates with the LSP circuit 10 to implement selected data block priority servicing. Long Sector Processing is useful in any multiplexed data access environment where data locations are accessible serially. However, for simplicity, the description herein is limited to applications in connection with a Rotational Position Sensing (RSP) disk drive environment. In the disk drive environment of FIG. 1, the SCU 12 interfaces a computer mainframe or central processing unit (CPU) 14 via data and control buses 16 and 18 with a plurality of disk drives 20 (numbered 0 through 7). A common signal bus 22 connects all drives 20 to the SCU 12. The LSP circuit 10 is incorporated into each disk drive 20. The SCU 12 is provided with instruction capability for communicating with each LSP circuit-equipped disk drive 20. The capability may comprise circuitry or microcode internal to the SCU 12. Each drive 20 is connected through dedicated read/write cables 24 to SCU 12. In the computer data storage system herein described, the data is serially arranged in time-referenced units (herein called sectors) on tracks of a storage medium. At least two independently operating mass storage devices are coupled to a common controller.

In a disk operating system, each disk drive 20 is designed to read data into and write data off of rotating disks 24 (FIG. 1A), the data being arranged in periodic tracks 26 figuratively illustrated on upper and lower surfaces of a parallel stack of disks 24 sharing a common spindle 28. The collection of tracks of a disk stack is referred to as a cylinder, a cylinder being defined relative to a set of vertically aligned read/write heads 30 positioned over a selected track 26 on all disk surfaces. The manner in which the tracks 26 of the same disk are distinguished from one another is not important to this invention.

Each track 26 (or cylinder) is subdivided into a plurality of sectors 32. In FIG. 2 a diagram of track 26 (or cylinder) of all disk drives 20 is illustrated as they might be in relation to one another at a selected window in time. In a typical architecture $2^7 = 128$ equally spaced sectors are provided in each track 26. For simplicity, only $2^4 = 16$ sectors are shown in FIG. 2.

Figure 1:
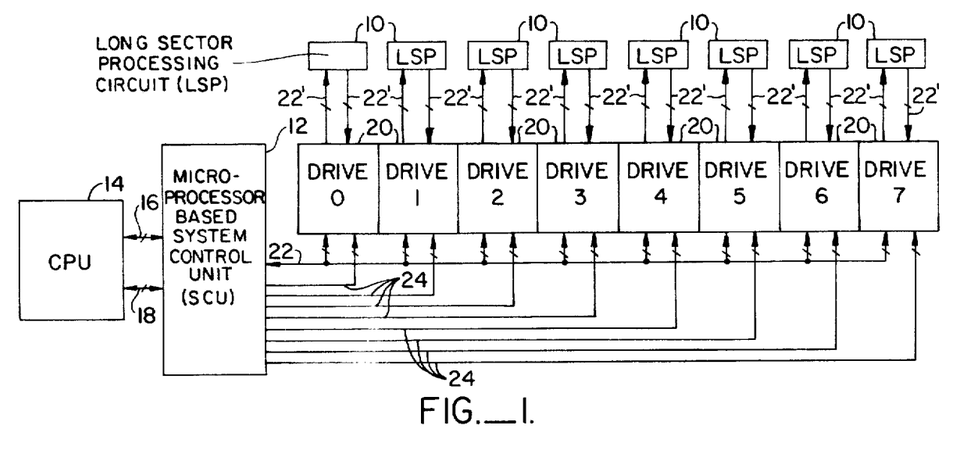
FIG. 1 is a block diagram showing the interconnection of a long sector processor with a computer system.
Figures 1A, 2:
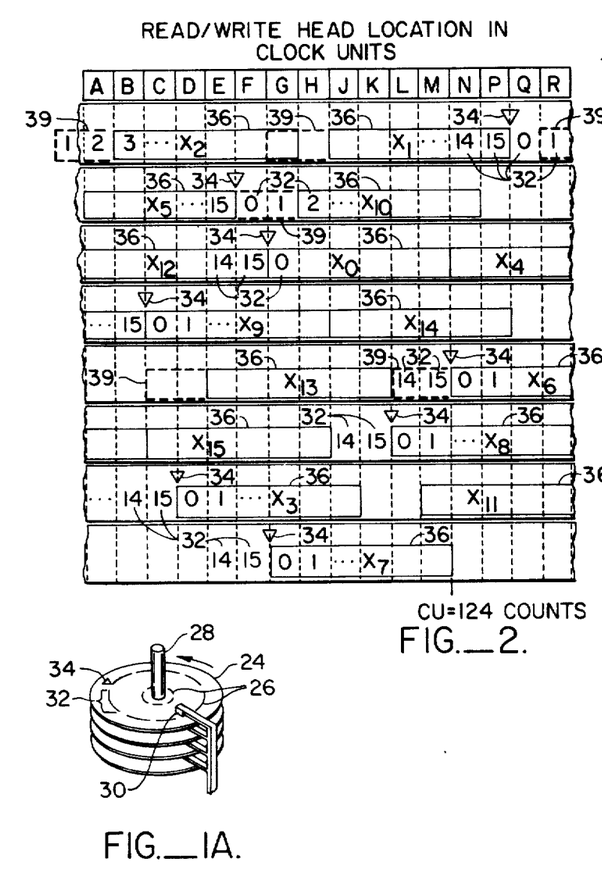
FIG. 1A is a pictorial block diagram illustrating a rotatable disk format.
FIG. 2 is a diagram illustrating long sector processing according to the invention.

Each sector 32 is referenced by its relation in terms of the number of clock units (or sector counter units) to a fixed physical location on the track 26 called an "index" 34 (shown figuratively in FIGS. 1 and 2). Blocks of data, called data records 36, are stored in the serially arranged sectors 32, the locations of which are defined as a "relative displacement" with reference to the index 34 of each disk drive. For convenience, data records 36 may be labeled sequentially $X_0$ to $X_{15}$. Each data record may require one or more sectors 32 of sequential storage space of one track (or cylinder) 26. The data records 36 cyclically pass the read/write head 30 of each disk drive as the disk 24 spins. Therefore, data records are available for access only during short periods or windows of time. The location of the read/write head 30 can therefore be visualized as advancing sequentially relative to the data sectors 32 at the increment or sector count of a master clock.

Actual data recording may be by means of variable length records uniquely identified physically by a previous label (ID.) The sector location or address is a means of relatively locating the ID field. In the examples of FIG. 2, the sum of control unit connection/disconnection times normal RPS connection, data transfer time, and lag factors is assumed to require six sectors. This assumption simplifies the examples hereinbelow, since it permits instantaneous SCU-drive interaction to be used for illustrative purposes of demonstrating efficiency. The initial environment defined in the examples shows all eight disks with requests from the controller outstanding. It is assumed that when a disk completes transfer of data, no new request is issued to that disk. This is not normal behavior in a real operating environment, but it does maintain the simplicity of the examples of FIG. 2.

All disks 24 rotate at approximately the same velocity, although rotation is actually asynchronous. For short periods of time a dynamic map or catalog of data storage locations can be constructed based on the relative displacement of each data record 36 from the index 34 of each disk drive and the number of sector counter clock units the disk 24 has advanced since the index 34 on the disk 24 crossed the read/write head 30 of the disk drive 20.

In a normal command sequence or command chain, the SCU 12 issues a request to transfer data to selected drives 20, then it scans the disk drives 20 looking for a report of readiness to perform a data transfer, as indicated by a sector interrupt signal. This condition indicates that the next available sector 32 is in position to read or write data. If the SCU 12 can obtain access to the main frame of the computer (the CPU 14 and its main memory) during the pendency of a sector interrupt, then the SCU 12 issues a second command which transfers system control to the designated disk drive 20. The likelihood that a particular disk drive will be issued the second command by the SCU 12 is related to the duration of its sector interrupt signal.

According to the invention, the likelihood of early access to a chosen data block is enhanced by increasing the duration of the interrupt signal indicating the availability of a priority data block and by advancing the apparent initial location or address of the data block in a data location catalog.

The invention is best understood in terms of an explanation of operation of the SCU 12 relating to the access of data blocks having been assigned a priority. The SCU 12, however, performs other operations whose exact nature is not important to an understanding of the invention. These functions can include directing the selection of tracks to be accessed, calculating data locations by the relative sector and communicating with the CPU 14.

Figure 2A:
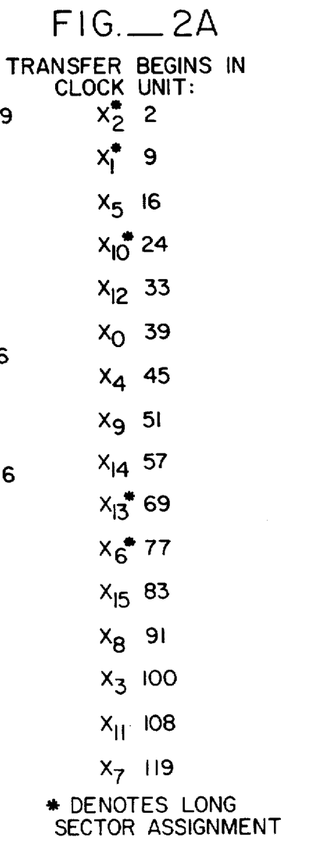
FIG. 2A is a table illustrating the order of data block processing according to the invention of the data blocks of FIG. 2.

The operation of invention is illustrated by FIG. 2 and the table of FIG. 2A. The SCU 12 defines locations with reference to sliced clock units, in FIG. 2 consecutively designated A through R, corresponding to the number of sectors 36 of each periodic track. Only sixteen are shown, as explained above.

The table of FIG. 2A illustrates system operation. Each row represents a track of a different disk drive. Beginning with data block $X_2$ (Row 1), it will be noted that a two-sector clock unit priority or long sector assignment 39 has been assigned to the data block. Therefore data block $X_2$ is advanced in queue position over data blocks $X_5$ and $X_{12}$. Data block $X_2$ is thus accessed first. Servicing data block $X_2$ requires eight sectors (including the long sector priority assignment 39). At the end of servicing, at Sector 11, the SCU looks for the next available data block. In this case, the next available data block is $X_1$, which has also been assigned a priority 39. After the servicing of $X_1$, $X_5$ (of Row 2) is the next available data block. The service cycle continues until all data blocks have been attended to or until otherwise interrupted.

In the example illustrated (FIG. 2A), the demand or priority requests are serviced in 82 clock units. Computation of outcome of queue positioning according to the standard processing would require 106 clock units to service the demand requests.

The improvement in demand requests occurs with some decrease in the efficiency of throughput. In this example, standard RPS processing requires 113 clock units to complete while Long Sector Processing requires 124 clock units to complete all servicing. Another way of viewing the improvement in demand request processing for this example is to recognize that the average access to any demand data block improves from 1.26 rotations to 0.96 rotations of the periodic track.

Figures 3, 3A:
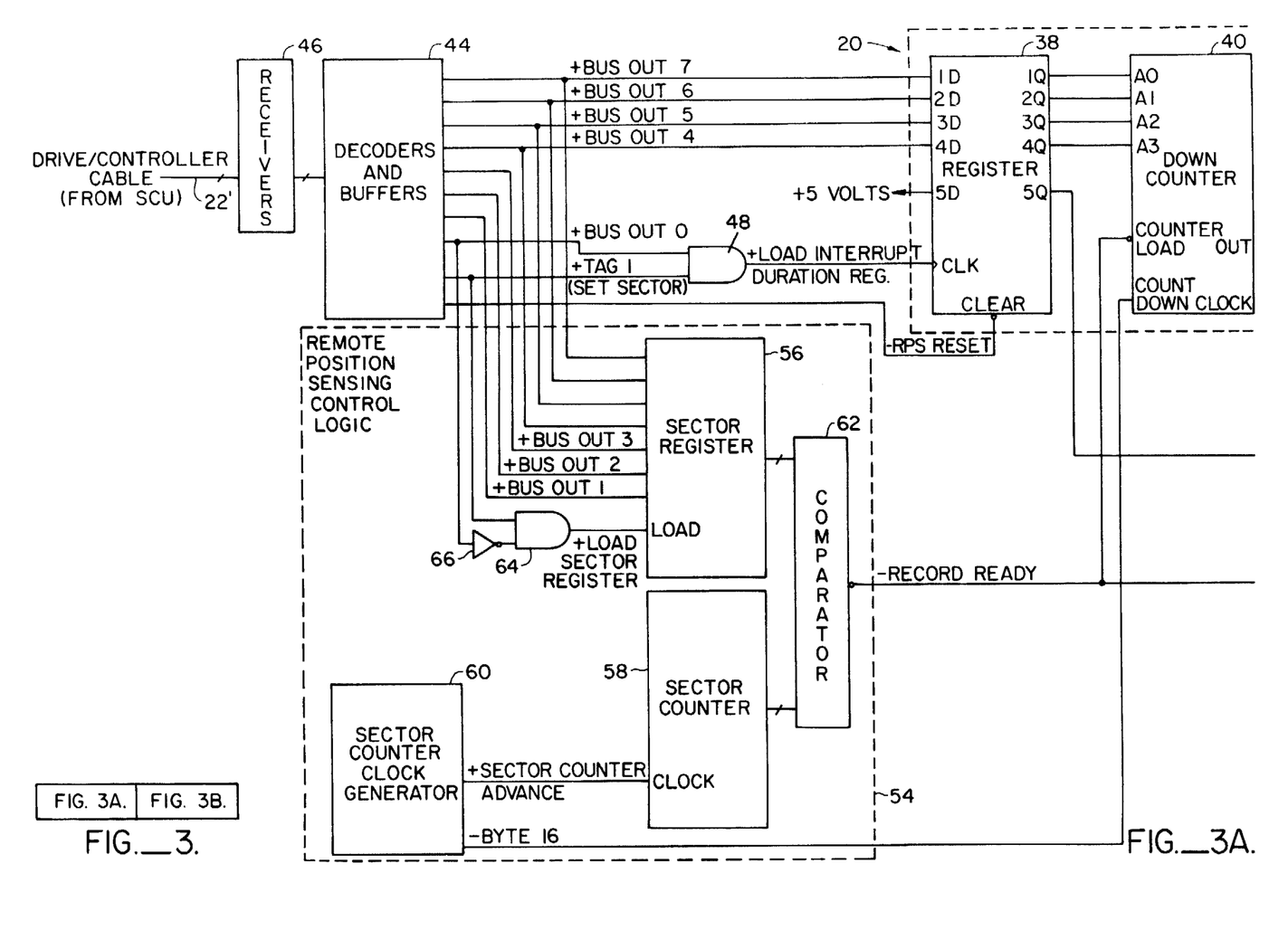
FIG. 3 illustrates the arrangement of FIGS. 3A and 3B.
FIGS. 3A and 3B together are a detailed block diagram of a circuitry for a long sector processor.
Figure 3B:
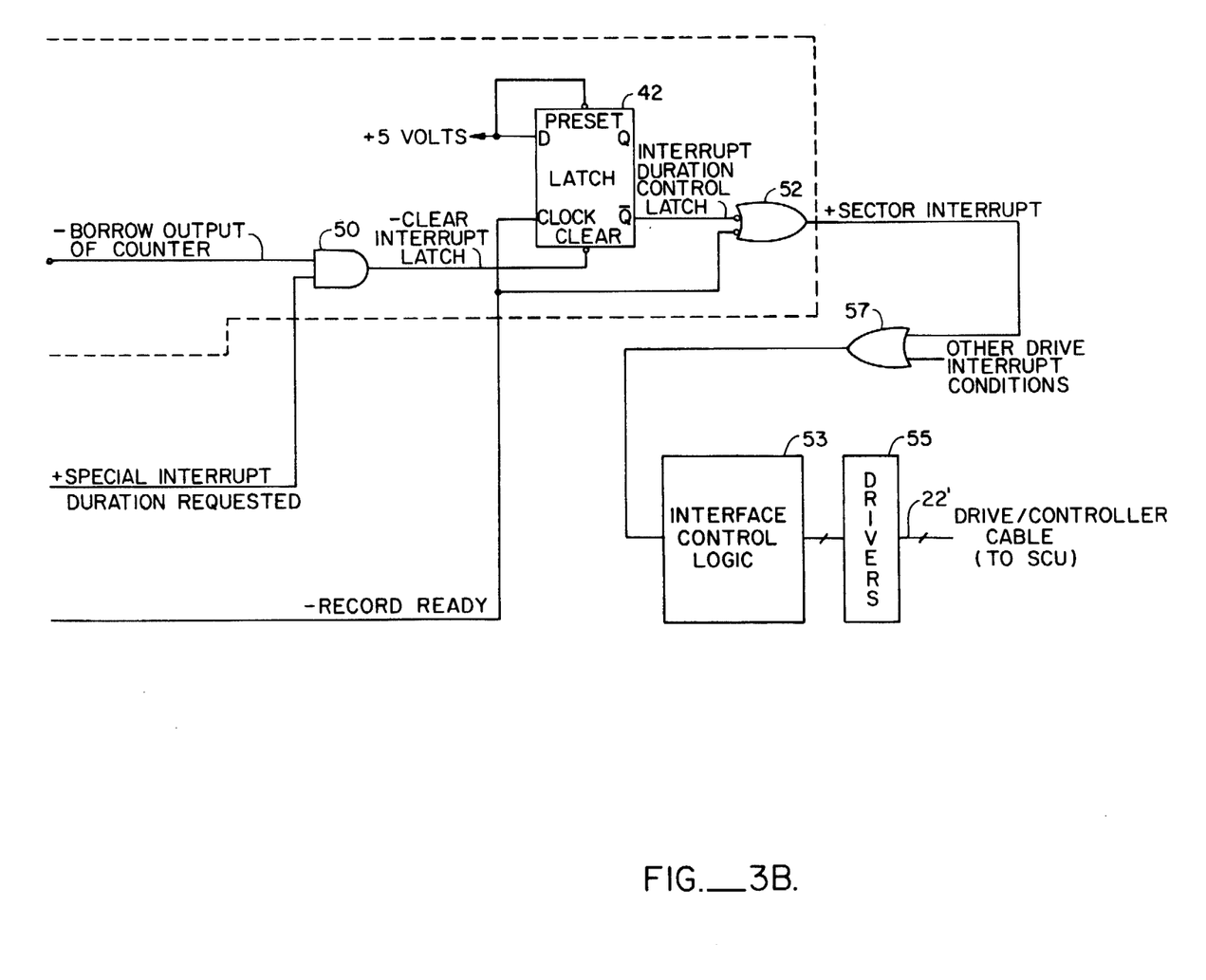

In FIGS. 3A and 3B an LSP circuit 10 block diagram is shown, together with selected interface circuitry and RPS control logic of SCU 12. The pertinent functional elements of LSP circuit 10 are a storage register 38, coupled to a down counter 40 which is coupled to an interrupt control latch 42. These elements are together operative to receive a long sector interval value and to issue a sector interrupt for a designated duration. The sector interrupt is typically provided through an OR gate 57, where other drive interrupt conditions are fed into the signal line, and thence to interface control logic 53. An output bus of interface control logic 53 is supplied to drivers 55 which drive the drive/controller cable 22' coupled to the SCU 12 (FIG. 1).

Figure 4:
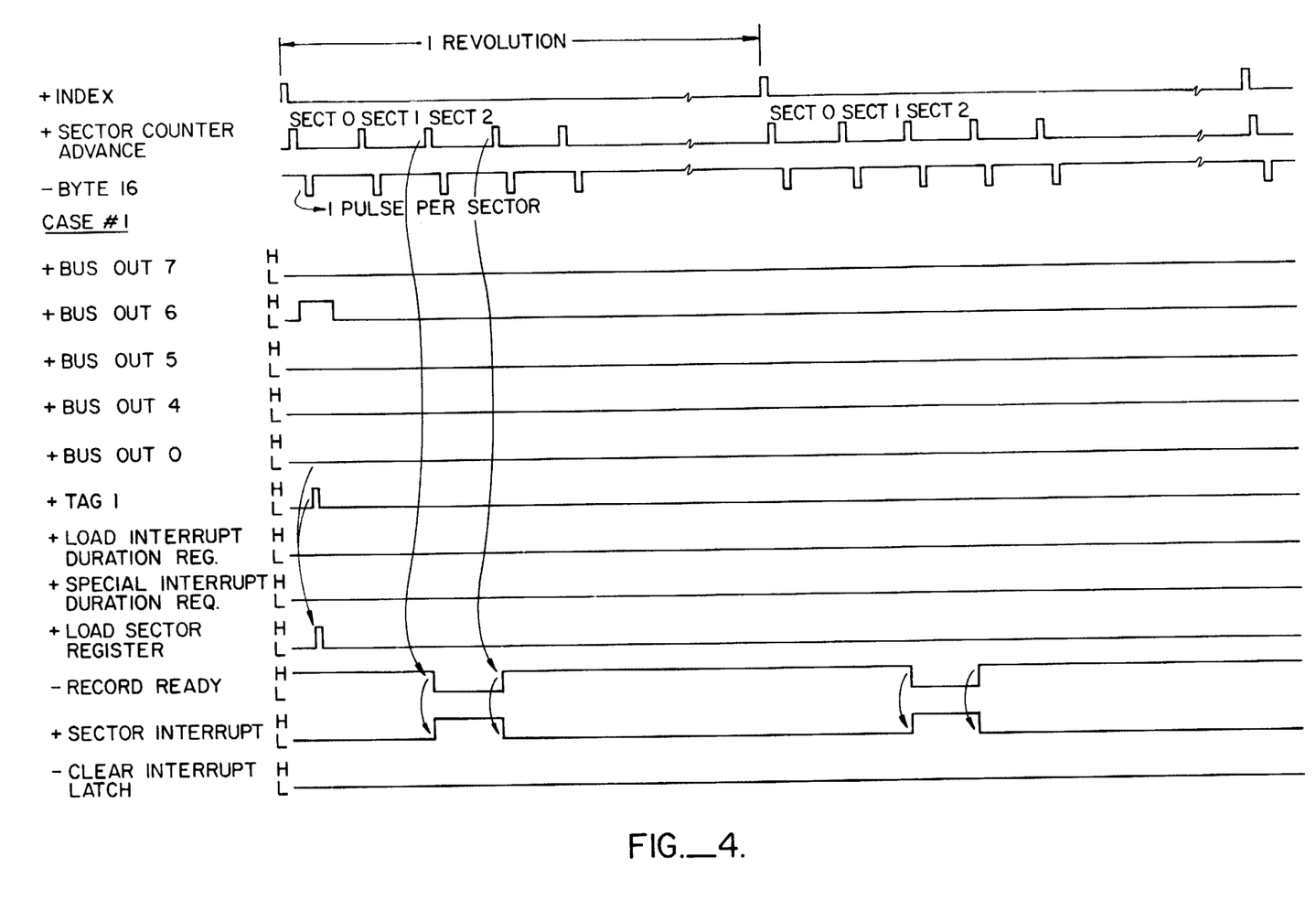
FIG. 4 is a waveform diagram of a first mode of circuit operation.
Figure 5:
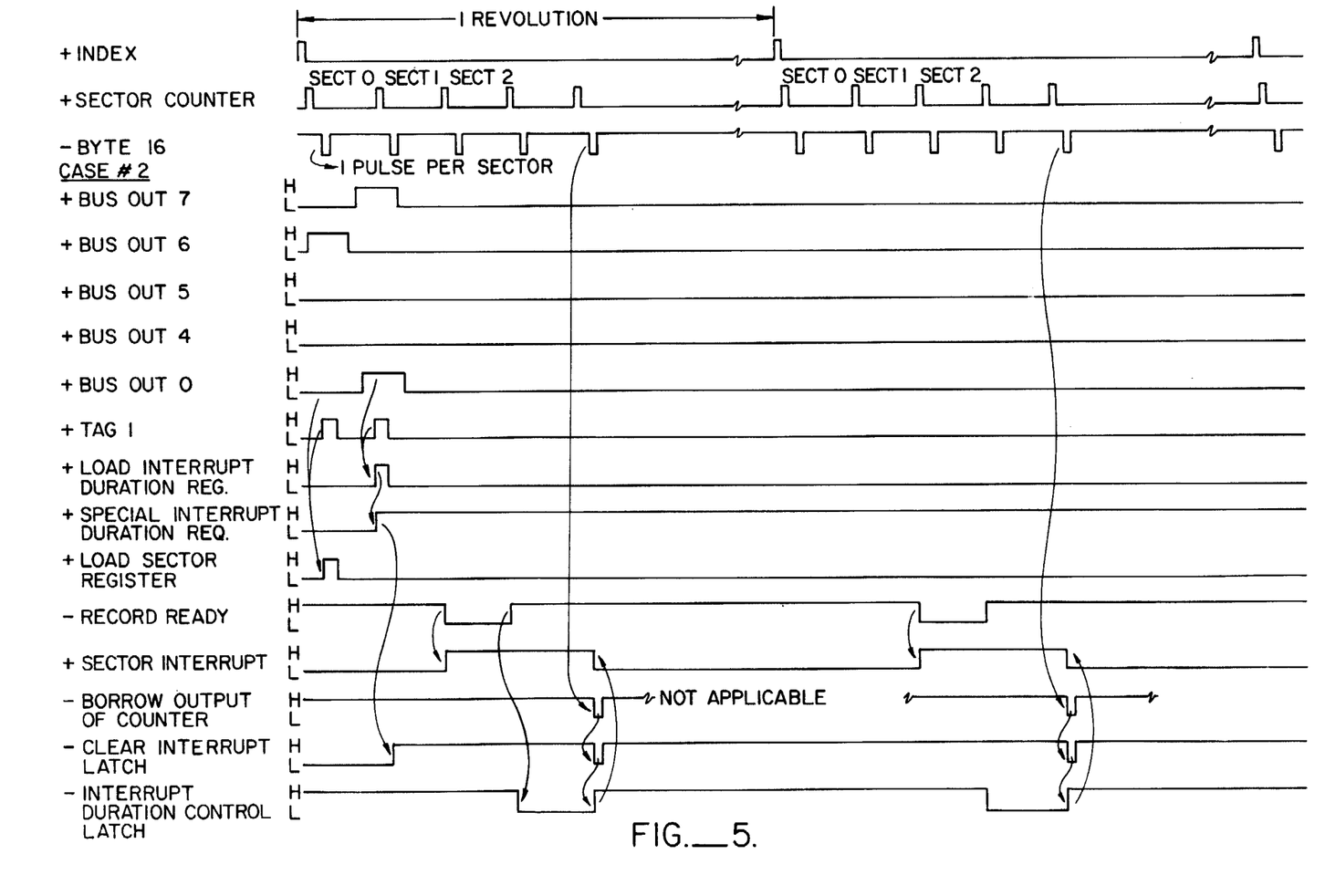
FIG. 5 is a waveform diagram of a second mode of circuit operation.
Figure 6:
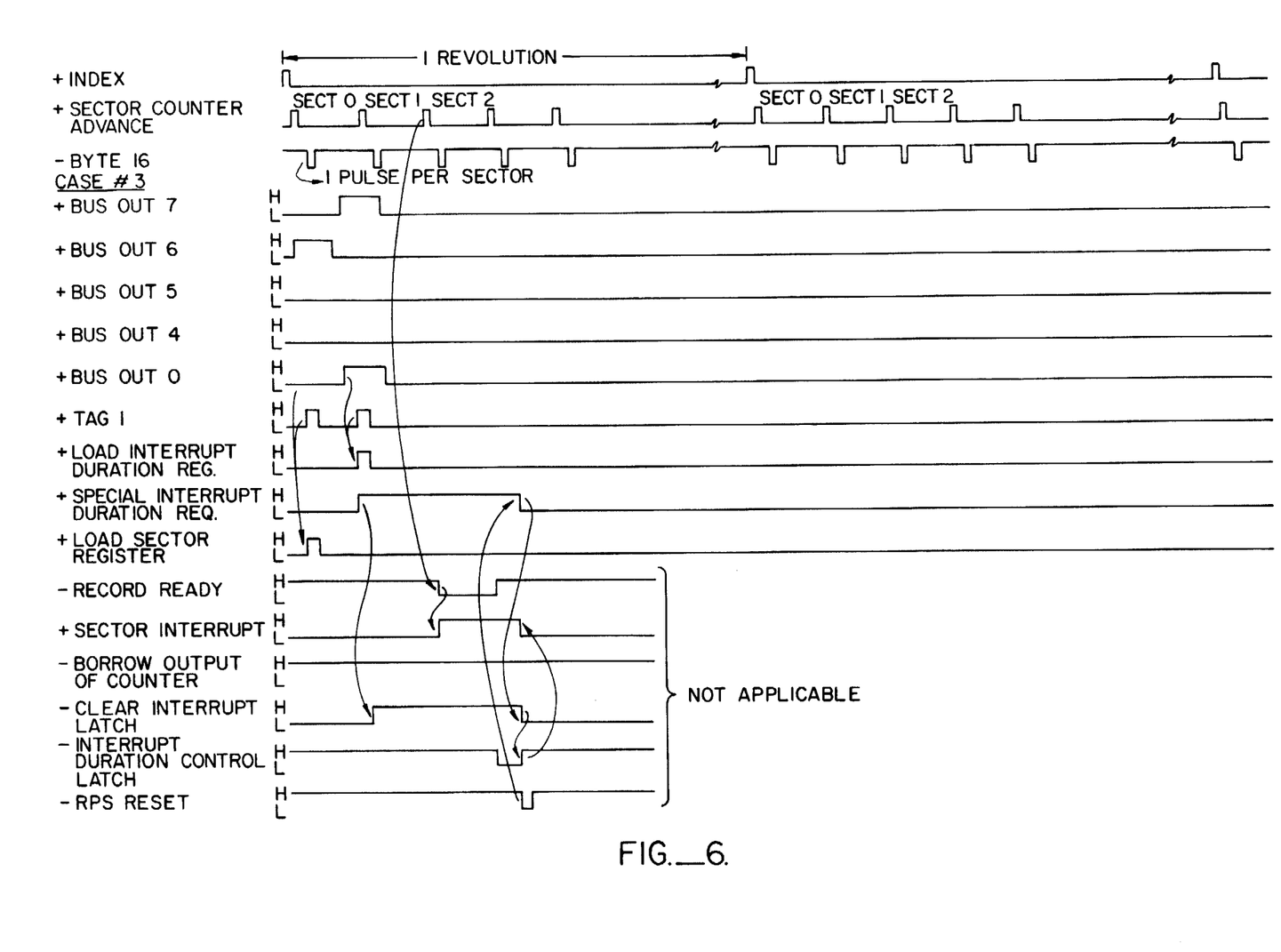
FIG. 6 is a waveform diagram of a third mode of circuit operation.

The circuit of FIGS. 3A and 3B is reasonably self-explanatory in conjunction with the timing diagrams FIGS. 4 through 6. However, the following explanation will assist in an understanding of the novel features of the circuitry.

Each signal line is labeled with either a command or a coupling designation. A plus (+) sign before a label indicates the designated condition is enabled or TRUE with a "positive" sense. A negative (−) sign indicates the converse. A circle (°) at an input or an output terminal indicates a signal inversion.

Referring particulary to FIGS. 3A and 3B, storage register 38 may be a type 74174 storage register operative with seven input terminals, namely, four variable data terminals 1D through 4D, a clock terminal CLK and a CLEAR terminal. A further input terminal 5D is tied to a TRUE reference for reasons hereinafter explained. Five output terminals 1Q through 5Q are provided, corresponding to 1D through 5D.

Decoders and buffers 44, from CUDI receivers 46, couple a parallel four bit digital signal to terminals 1D through 4D of register 38, as provided by a data channel from SCU 12. (FIG. 1). The four corresponding data signal lines are designated +Bus Out 7 through 4, respectively.

The four-bit signal on lines +Bus Out 7 through 4 identifies the value or length (in sector clock units) of the long sector interval. The interval is externally assigned. Within the SCU 12 the catalog is modified such that the interval represented by the four-bit signals is appended to the beginning of each selected data block to advance the queue position of the data block. The interval may be from zero (one clock interval) to fifteen units (sixteen clock intervals).

The output of an AND gate 48 is coupled to the clock input CLK of storage register 38 via a control line labeled +Load Interrupt Duration Register. The AND gate 48 is for comparing two control signals from decoders and buffers 44 labeled +Bus Out 0 and +tag 1 (also called +Bus Out 0). Tag 1 is the Set Sector command of the RPS command set. The coincidence of Bus Out 0=TRUE and Tag 1=TRUE at AND gate 48 causes storage of the data at data inputs 1D through 4D, the contents of register 38 being made available at outputs 1Q through 5Q. Output 5A is operative to issue a command to one input of an AND gate 50 indicating a Special Interrupt Duration Request, overriding the normal RPS +Sector Interrupt signal. In order to clear the register 38, an +RPS Reset command, externally generated, is issued to the CLEAR terminal of register 38. The RPS Reset command also has the effect of generating a FALSE signal via the Special Interrupt Duration Requested line to AND gate 50. The consequence of this signal is explained hereinafter in conjunction with Example 3.

Down counter 40 may be a type 74193 UP-DOWN counter wired to decrement. Counter 40 receives the four-bit long sector interval value at parallel inputs A0 through A3 upon an externally generated −Record Ready signal inverted and provided to its Counter Load terminal. The counter 40 is operative to decrement the value of the long sector interval with each positive transition of an external Clock signal provided at a Count Down Clock Terminal. Counter 40 issues a −Borrow Output signal at zero. This signal, when provided to the other input of AND gate 50 causes a −Clear Interrupt Latch command to be generated.

Latch 42 is a conventional D-type bistable multivibrator (or flip-flop) with the D input tied to a TRUE value and the Preset input tied via inversion of the TRUE level to a FALSE value. The externally generated Record Ready signal line is coupled to the clock input. The CLEAR input is coupled via inversion to the output of AND gate 50, i.e., the −Clear Interrupt Latch line. Only the $\overline{Q}$ output of latch 42 is used. The $\overline{Q}$ output and −Record Ready signal lines are coupled to the input terminals of a dual input NAND gate 52 (such as a type 7400), shown here as a negated OR gate. NAND gate 52 issues a +Sector Interrupt signal in all states except when both $\overline{Q}$ is TRUE (High) and −Record Ready is FALSE. The persistence of the +Sector Interrupt signal indicates the continued availability of the data block of the referenced drive for access. The longer the +Sector Interrupt signal is enabled the higher the likelihood that control will be transferred to the referenced drive since the period of its indicated availability comprises a greater percentage of the polling or scanning cycle of the SCU 12. The exact sequence of operation under various conditions is explained hereinafter below in connection with the diagrams of FIGS. 4–6.

In order to understand the interaction of the LSP circuit 10 with an RPS system, it is helpful to understand how the −Record Ready signal is generated. Reference is made to RPS control logic 54 of FIG. 3A.

The RPS control logic 54 of particular interest comprises a sector register 56, a sector counter 58, which may be a ring counter or the like, a sector control clock generator (CLOCK) 60, a comparator 62 and a dual input AND gate 64 with an inverter 66 at one input. Data lines +Bus Out 1 through 7 are coupled to sector register 56. Data line +Tag 1 is coupled to the first input of dual input AND gate 64 and data line +Bus Out 0 is coupled through inverter 66 to the other gate input. Clock generator 60 is coupled via a +Sector Counter Advance control line to a clock input of sector counter 58 and provides one pulse per sector to sector counter 58. In addition, a control line labeled −BYTE 16 is coupled to the Count Down Clock input of Down Counter 40, which is operative to provide a pulse per sector slightly delayed relative to the Sector Counter Advance. The encoded outputs of Sector Register 56 and Sector Counter 58 are provided to comparator 62. At coincidence, comparator 62 issues a −Record Ready signal, indicating that a designated sector is in the correct location for issuance of the −Record Ready signal.

The SCU 12 issues Tag 1=TRUE and Bus Out 0=FALSE to load sector register 56 with the data of Bus Out 7 through 1. These data define the sector at which the −Record Ready signal is issued. The SCU 12 also issues Tag 1=TRUE and Bus Out 0=TRUE to load the value of the long sector interval into register 38. The drive 20 immediately commences to search for the requested sector, identified by the data in sector register 56. Sector counter 58 tallys with the clock pulses. The −Record Ready signal issues at coincidence of the value in sector register 56 and sector connector 58 and each periodic cycle thereafter of the sector counter 58 until the system is otherwise reset.

EXAMPLE 1

FIG. 4 illustrates a normal search for a data block. The normal search is initiated by the Tag 1 command which triggers the Load Sector Register command. In the example, Bus Out 6 is TRUE. This is equivalent to a request for a Sector Interrupt signal starting at Sector Number 2. The sector queuing is not affected by this sequence. Instead, the −Record Ready signal issues at the commencement of Sector Number 2 and the +Sector Interrupt signal follows immediately thereafter through NAND gate 52. Latch 42 has no effect because it is disabled by the persistence of −Clear Interrupt Latch=TRUE from AND gate 50. In other words, a CLEAR command is issued to latch 42 except when both the Special Interrupt Duration Requested signal is TRUE (high) and the −Borrow Output signal is TRUE (low).

EXAMPLE 2

In the example of FIG. 5, the LSP circuit 10 is activated. Data line Bus Out 4 through 7 reads $0010_2$ at Sector Counter Unit=0 which indicates requested data coupling must commence with the sector location corresponding to Sector Counter Unit=2. At Sector Counter Unit=1, data lines Bus Out 4 through 7 read $0001_2$. The coincidence of Bus Out 0=TRUE and Tag 1=TRUE initiates the Load Interrupt Duration Register command, which issues a sustained Special Interrupt Request signal to AND gate 50. The −Clear Interrupt Latch command is also thereupon disabled (=FALSE) thereby activating latch 42. The −Record Ready signal issues at the commencement of Sector 2 for one sector duration. The Sector Interrupt signal issues immediately following the issuance of the −Record Ready signal.

At the end of one sector the trailing edge of the Record Ready signal triggers the latch 42 output $\bar{Q}$ which maintains the Sector Interrupt signal enabled as the −Record Ready signal drops to its disabled state. In other words, the Sector Interrupt signal is not disabled as in Example 1. The effect is to append an extended duration or Long Sector Interrupt signal to a normal duration Sector Interrupt signal. The condition is maintained until down counter 40 at the clock signal issues its −Borrow Output=TRUE (low) signal to AND gate 50. Thereupon the AND gate 50 initiates the −Clear Interrupt Latch=TRUE (low) command, which in turn disables the Interrupt Duration Control Latch command at the input of NAND gate 52 terminating the Sector Interrupt signal. The cycle repeats with each issuance of the Record Ready signal, as outlined above, for each revolution of the disk.

EXAMPLE 3

In FIG. 6, the same sequence is followed as in Example 2. However, an external reset command is issued at a random time, which resets the LSP circuit 10 to its initial conditions. The command −RPS Reset clears the interrupt duration logic in preparation for a subsequent cycle or transfer of control to another peripheral device.

The LSP circuit 10, herein described operates in connection with a multiplexed data transfer system utilizing an RPS-based controller (SCU 12) which is adapted to provide a processing preference to data blocks identified by a priority assignment. The priority assignment of the SCU 12 is implemented as follows:

Each data block to be read is identified by a label or ID and its sector location is calculated (based on the location of this ID) relative to the index of its disk. Selected data blocks are externally designated as priority data blocks, indicating processing preference is to be given. The priority assignment is expressed as a code which is included in the command from the SCU to the disk. The priority code may be an externally selected value chosen to correspond to a desired extension in the apparent length of the data block and is measured in sector units. The variable priority code can also represent a variable duration Long Sector Interrupt signal value.

Each of the priority designated data blocks is assigned a "look-ahead" advantage, that is, the address of each such data block location is advanced toward the index location although the actual location of the data is not changed. A "spacer" is effectively created between the indicated location and the actual location of the data block. The spacer may be an internal bookkeeping operation similar to the compensation for lag factors wherein the difference value between the actual and apparent address location is registered to account for overlap in apparent locations of data.

In the illustration of FIG. 2, each of the designated priority data blocks, namely $X_2$, $X_1$, $X_{10}$, $X_{13}$, and $X_6$, has been assigned a uniform two sector look-ahead advantage, or long sector interval 39, over the actual data location.

Prior to a transfer of data, a map may be created of the position of each disk relative to the read/write head, based on sensed locations of the disk indexes. A queue may be set up by comparing the initial address of each data block. Data blocks are then accessed according to queue location relative to the read/write heads of each drive.

A sequence of real time operation may be as follows: A request for data is transmitted by the CPU 14 to the SCU 12. If priority status is desired, the request includes a Long Sector Interrupt indicator. The request is directed by the SCU 12 over the control channel 24 to the particular peripheral disk drive 20 addressed. The SCU 12 scans or polls the peripheral disk drives 20 to ascertain if any are in position to respond with data, i.e., if any data blocks are within the data access window and available for immediate data transfer. Those disk drives having data within the window issue the +Sector Interrupt signal as explained above. If the SCU 12 is active with another disk drive 20 or another CPU 14 request, a disk drive Sector Interrupt signal will not be responded to by the SCU 12. In this case, once the window has passed, the +Sector Interrupt signal is dropped by the disk drive. During the period when either the +Sector Interrupt signal of one disk drive is not being acted on or the SCU 14 is otherwise not occupied, the first subsequently occurring +Sector Interrupt signal will be responded to by the SCU 14. If the SCU 12 can respond to a +Sector Interrupt signal a connection is made to allow data transfer to begin from the disk drive to the SCU 12 and through to the CPU 14 memory. This sequence is constantly repeated with all of the disk drives 20 interacting with the SCU 12 to effect data transfer requests made by the CPU 14.

The invention has now been explained with reference to specific preferred embodiments. Further embodiments will be apparent to those of ordinary skill in the art in light of this disclosure. For example, Long Sector Processing works especially well in any system where data storage locations are arranged to be periodically accessible, that is, where data blocks are disposed in a closed loop and serially accessible on a cyclic or periodic basis. Rotating drums, flexible disk drive systems, charge coupled devices, bubble memories, shift registers and the like are examples of storage media system according to the invention. In addition, the invention can be adapted for use where data blocks are serially accessible generally, such as tapes, storage cylinders and the like, where access time is substantially slower than in conventional disk drive or periodic data storage systems. However, for simplicity the detailed description has been limited to a description of the preferred embodiment in a multiplexed disk drive system operating with an intelligent peripheral input/output (I/O) controller, such as an ISS Sperry-Univac Model 7835 Controller coupled to Model 7350 disk drives. Therefore, it is not intended that the invention be limited, except as set forth in the appended claims.

We claim:

1. In a system having an auxiliary processing unit for input and output control of data between a memory of a computer central processing unit and a plurality of data storage devices having digital data blocks which are arranged in serial format on a circular track and which are accessible to input and output means of said data storage devices only during limited time intervals, wherein selected ones of said data blocks have been assigned a priority value corresponding to an advance in the apparent initial location of each one of said data blocks in said circular track, a circuit associated with each one of said data storage devices for issuing an extended duration interrupt signal to said auxiliary processing unit for temporarily blocking access by other data storage devices to said central processing unit in connection with an advance of the apparent initial location of said selected data blocks, said circuit comprising:

means coupled to said auxiliary processing unit for receiving and storing said priority value;

means coupled to said receiving and storing means and to said auxiliary processing unit for converting said stored priority value to a signal having a duration corresponding to said priority value in response to a synchronizing signal from said auxiliary processing unit;

means coupled to said auxiliary processing unit for distinguishing between data blocks; and means responsive to said duration signal of said priority value converting means and to said distinguishing means for issuing said extended duration interrupt signal during one of said limited time intervals to said auxiliary processing unit, wherein said receiving and storing means is a digital storage register; said timing means is a down counter coupled to a data output of said storage register; and said signal issuing means includes a latch circuit coupled to an output of said timing means and a gate coupled to an output of said latch circuit and coupled to an output of an external signaling means which is operative to sense the position of said input and output means relative to sector location, said gate being operative to receive an output signal from said latch circuit and from said external signaling means to issue to said auxiliary processing unit a normal duration interrupt signal and to append thereto said extended duration interrupt signal at the termination of said normal duration interrupt signal for temporarily blocking access by other data storage devices to said central processing unit and thereby to increase the likelihood of access to said central processing unit memory of said selected ones of said data blocks which have been assigned a priority value.

2. A circuit according to claim 1 wherein said gate is a NAND gate.

3. In a computer system having a central processing unit and a memory associated therewith, a plurality of peripheral data storage devices having an input and output means, and an auxiliary processing device connected between said central processing unit and said peripheral storage devices for controlling the transfer of data between said central processing unit memory and said peripheral storage devices, each one of said peripheral storage devices having data storage means disposed in circular tracks for storing batches of data in serially arranged digital data blocks of various lengths, each one of said peripheral storage devices being operative to circulate said data blocks past said input and output means in each one of said peripheral storage devices asynchronously with respect to data blocks in other peripheral storage devices, each one of said peripheral storage devices being further operative to issue a readiness interrupt signal for indicating a period of readiness for access to a specified one of its data blocks, said specified data block being thereby made accessible to said central processing unit memory through said input and output means only during a time window, or limited periodic time interval, each one of said data blocks having an address identifier referenced to a physical location index of said circular tracks, the displacement of each one of said location indexes from said input and output means being generally known only to its peripheral storage device, a method for minimizing waiting time of batches of data in specified data blocks designated for preferential access to said central processing unit memory while minimizing waiting time of said central processing unit, said method comprising the steps of:

(a) designating preselected ones of said data blocks for preferential access to said central processing unit memory by providing a recordable signal associated with the address identifier of said preferential access designated data blocks, which signal is recognizable as an address-modifying code by said auxiliary processing device;

(b) in response to said address modifying signal code, causing said auxiliary processing device to advance the apparent initial location, relative to its location index, of each one of said preferential access designated data blocks without modifying the physical location of said preferential access designated data blocks;

(c) in response to a request, issued by said central processing unit, for access to a preselected group of data blocks, said group including at least one of said preferential access designated data blocks, causing said auxiliary processing device to issue to peripheral storage devices having data blocks of said preselected group a request to transfer data, and further causing said auxiliary processing device to poll each one of said peripheral storage devices until one of said peripheral storage devices issues a readiness interrupt signal indicating readiness for data transfer of a batch of data from or to one of its data blocks of said preselected group;

(d) during issuance of said readiness interrupt signal, causing said auxiliary processing device to issue to said central processing unit a signal indicative of access readiness and further causing said auxiliary processing device to await a positive response signal from said central processing unit;

(e) upon occurrence of said positive response signal during said readiness interrupt signal, causing said auxiliary processing device to transfer control of said central processing unit to said peripheral storage device for data transfer between said peripheral storage device and said central processing unit memory; and (f) at the termination of said data transfer, repeating steps (c) through (e) until all of the data blocks of said preselected group have been granted access to said central processing unit memory.

4. The method as claimed in claim 3 wherein said designating step further comprises providing said recordable signal as an address modifying code which specifies differential values of advancement of the apparent initial location of corresponding ones of said preferential access designated data blocks, a greater value indicative of a higher priority, and wherein the length of advance effected by said advance causing step is proportional to the value specified by said address modifying code, thereby to define a priority ranking among said preferential access designated data blocks.

5. The method as claimed in claim 4 further comprising the step of causing said one of said peripheral storage devices issuing a readiness interrupt signal for one of said preferential access designated data blocks to increase the length of said readiness interrupt signal in response to said address modifying code, the increase in length of said readiness interrupt signal being in proportion to the length of said advance of apparent initial location indicated by said address modifying code.

* * * * *